United States Patent [19]

Marlor

[11] Patent Number: 5,153,761
[45] Date of Patent: Oct. 6, 1992

[54] HIGH PERFORMANCE LIGHT VALVE HAVING DOUBLE LAYER PHOTOCONDUCTOR

[75] Inventor: Guy A. Marlor, Los Altos, Calif.
[73] Assignee: Everex Systems, Inc., Fremont, Calif.
[21] Appl. No.: 799,690
[22] Filed: Nov. 22, 1991

Related U.S. Application Data

[63] Continuation of Ser. No. 496,533, Mar. 20, 1990, abandoned.

[51] Int. Cl.⁵ .................. G02F 1/135; G02F 1/137
[52] U.S. Cl. .................................... 359/72; 359/71; 359/79; 359/294; 359/246
[58] Field of Search ............... 350/342, 331 R, 339 R, 350/334, 338, 351, 341, 355, 356, 359, 361; 353/30, 122; 357/16, 30

[56] References Cited

U.S. PATENT DOCUMENTS

| | | | |
|---|---|---|---|
| 2,892,380 | 6/1956 | Baumann et al. | 350/342 |
| 3,592,527 | 7/1971 | Conners et al. | 350/342 |
| 3,625,591 | 12/1971 | Freiser et al. | 350/342 |
| 3,663,086 | 6/1972 | Assouline et al. | 350/342 |
| 3,694,053 | 6/1972 | Kahn | 350/347 E |
| 3,723,651 | 12/1973 | Gorog | 350/342 |
| 3,732,429 | 11/1973 | Braunstein et al. | 350/342 |
| 3,736,047 | 12/1973 | Gelber et al. | 350/342 |
| 3,744,879 | 10/1973 | Beard et al. | 350/342 |
| 3,824,002 | 12/1974 | Beard | 350/342 |
| 3,976,361 | 10/1975 | Fraas et al. | 350/342 |
| 3,998,524 | 8/1975 | Hubby, Jr. et al. | 350/342 |
| 4,019,807 | 3/1976 | Boswell et al. | 350/342 |
| 4,032,954 | 6/1977 | Grindberg et al. | 350/342 |
| 4,127,322 | 12/1975 | Jacobson et al. | 350/342 |
| 4,206,979 | 6/1980 | Jost | 350/342 |
| 4,343,535 | 12/1982 | Bleha, Jr. | 350/342 |
| 4,767,192 | 8/1988 | Chang et al. | 350/342 |
| 4,873,524 | 6/1988 | Hubby, Jr. | 350/342 |
| 4,881,110 | 11/1989 | Braatz et al. | 359/72 |
| 4,925,276 | 5/1990 | McMurray, Jr. et al. | 350/334 |

OTHER PUBLICATIONS

S. Jost—"A new light-modulated liquid-crystal light valve" J. Appl. Phys. 49(10); Oct. 1978—pp.5332-5333.
D. B. Fraser and H. Melchior, Sputter-Deposited CdS Films with High Photoconductivity through Film Thickness, J. Appl. Phys. vol. 43, No. 7 Jul., 1972, pp. 3120-3127.
S. M. Jarrett et al A Liquid Crystal Light Valve with RGB Color Stripes, Society of Information Display 1986 1986 Digest, pp. 383-384.
W. P. Bleha et al Optical Engineering vol. 17, No. 4 pp. 371-384.
Grove, Physics and Technology of Semiconductor Devices, Wiley Press, 1976, pp. 156-163.
T. D. Beard et al A.C. Liquid Crystal Light Valves, Applied Physics Lett., vol. 22 No. 3, pp. 90-92, Feb. 1973.
D. Casasent, Spatial Light Modulators and Their Use in Optical Data Processing, SPIE vol. 128 Effective Utilization of Optics in Radar Systems, 1977, pp. 56-67.
W. R. Roach, Resolution of Electrooptic Light Valves, IEEE Trans. Elec. Dev., vol. ED-21, No. 8, Aug., 1974 pp. 453-459.
Matsumoto et al., Field-induced deformation of hybrid-aligned nematic liquid Crystals: New Multicolor Liquid Crystal Display, Journal of Applied Physics, vol. 47, No. 9, Sep. 1976, pp. 3842-3845.
Real Time X-ray Visible Converter, Werner E. L. Haas, Xerox Disclosure Journal, vol. 3 No. 5 Sep./Oct. 1978, pp. 331-332.
Guest-Host Light Valve, Werner E. Haas, Xerox Disclosure Journal, vol. 10 No. 6 Nov./Dec. 1985, pp. 323-324.

*Primary Examiner*—Stanley D. Miller
*Assistant Examiner*—Tai V. Duong
*Attorney, Agent, or Firm*—Blakely, Sokoloff, Taylor & Zafman

[57] ABSTRACT

A high performance light valve for optimizing the switching of a liquid crystal on an area basis. The light valve uses a transparent charge separation layer to allow for the accumulation of photo-generated charges. The light valve concentrates the light absorption in a narrow charge generation region where high electric fields are present from the junction of dissimilar semiconductor materials. The light valve has a switching characteristic dominated by the light and dark carrier densities in a narrow reversed biased region.

16 Claims, 5 Drawing Sheets

FIG_4

HIGH PERFORMANCE LIGHT VALVE HAVING DOUBLE LAYER PHOTOCONDUCTOR

This is a continuation of application Ser. No. 07/496,533, filed Mar. 20, 1990, now abandoned.

BACKGROUND OF THE INVENTION

1. Field of the Invention

The present invention relates to the field of optical devices and more particularly to a light valve for amplifying light.

2. Related Application

The present application relates to copending application Ser. No. 07/497,134, filed Mar. 20, 1990, and titled "High Resolution Light Valve."

3. Prior Art

Various schemes for amplifying light are well known in the prior art. Devices which amplify light have been known since the late nineteenth century and these devices which amplify light on an area basis are commonly termed light valves. For example, U.S. Pat. No. 2,892,380 issued to Baumann et al. describes an arrangement of layers for providing an apparatus to amplify light from an optically projected image. In the Baumann et al. '380 patent, an apparatus is described in which a glass carrier has applied thereto an electrode of a transparent electrically conducting thin metallic layer. On this electrode there is a photoconductive layer of suitable thickness applied. On the photoconductive layer, a thin light-absorbing and electrically insulating layer having in turn an electrically non-conductive mirror layer is applied thereto. Over the mirror layer is a layer of a substance having an electric Kerr effect in which this layer has an optimum index of refraction which is variable when subjected to a variable electric field. Over this layer is a glass plate provided with an electric layer. Thus the mirror layer is located between the photoconductive layer to which the controlling light is applied and the layer with the electric Kerr effect through which the control light from the light source passes to the mirror and is reflected by the same through the layer with the electric Kerr effect. This arrangement described in the Baumann et al. '380 patent provides a basis for describing the essential features of current day light valves.

U.S. Pat. No. 3,592,527 (Conners et al.) describes a display device utilizing a nematic liquid crystal layer for displaying a projected radiation pattern by means of reflected ambient light. Subsequent use of light valves is described in U.S. Pat. No. 3,824,002 issued to Beard, in which an improved photo-activated liquid crystal light valve is described. In the Beard et al. '002 patent the electrically conductive elements of the light valve are separated from the liquid crystal layer by various insulating layers.

A different configuration is described in a patent application Ser. No. 538,381, filed Jan. 6, 1975, by W. P. Bleha, Jr., et al. and now abandoned, in which a liquid crystal material is in contact with inert insulating layers. In response to an external writing light, the photoresponsive layer modulates the field impressed upon the liquid crystal which, in turn, effects the birefringent optical activity of the liquid crystal. This change in birefringence is used to change the polarization state of linearly (or circularly) polarized read-out light. The Bleha et al. application further describes the response characteristics of a birefringent liquid crystal which represent respectively the transmission of the light valve for each of the three primary colors. By the application of proper voltage, a color projection capability is obtained from the scheme of Bleha et al. Further, an electro-optical system for real-time projection of very high brightness, full color pictorial images from a program source onto a large display screen from a set of three reflection type AC driven field effect mode birefringent liquid crystal light valves is described in U.S. Pat. No. 4,127,322, issued to Jacobson et al.

Further, in U.S. Pat. No. 4,019,807 (Boswell et al.), a reflective liquid crystal light valve with hybrid field effect mode is described. The liquid crystal of the Boswell et al. '807 patent is operated in a hybrid field effect mode and it utilizes the twisted nematic effect to create a dark off-state and the optical birefringence effect to create the bright on-state. A liquid crystal thus modulates the polarization of the coherent read-out or projection light responsively to the non-coherent image.

As is apparent from the description above, various light valve designs are known in the prior art. However, the use of prior art light valves in a video projection device has severe restrictions in that prior art light valves have switching characteristics which are severely limited. For example, in a video projection device which is to display motion, an image is typically changed 24 times per second in order for the human eye to satisfactorily perceive motion. Because of the limited switching characteristics of prior art light valves, resolution and performance of light valve amplification is severely limited and curtail the available grey scale rendition.

Accordingly, it is appreciated that what is needed is a light valve for amplifying light but having faster switching characteristics in order to provide a higher performance over prior art light valves in order to improve the display of motion in a video projection device.

PRIOR ART REFERENCES

U.S. Patents and Applications
1. U.S. Pat. No. 2,892,380 (Baumann et al.),
2. U.S. Pat. No. 3,592,527 (Conners et al.),
3. U.S. Pat. No. 3,824,002 (Beard),
4. U.S. Pat. No. 4,127,322 (Jacobson et al.),
5. U.S. Pat. No. 4,019,807 (Boswell et al.),
6. U.S. Pat. No. 3,976,361 (Fraas et al.),
7. U.S. Pat. No. 4,343,535 (Bleha, Jr.),
8. U.S. Pat. No. 3,663,086 (Assouline et al.),
9. U.S. Pat. No. 3,723,651 (Gorog),
10. U.S. Pat. No. 3,744,879 (Beard et al.),
11. U.S. Pat. No. 3,732,429 (Braunstein et al.),
12. U.S. Pat. No. 3,736,047 (Gelber et al.),
13. U.S. Pat. No. 3,700,306 (Cartmell et al.),
14. U.S. Pat. No. 3,694,053 (Kahn),
15. U.S. Pat. No. 3,625,591 (Freiser et al.),
16. U.S. Pat. No. 3,592,527 (Conners et al.),
17. U.S. patent application Ser. No. 538,381; filed Jan. 6, 1975 and now abandoned.

Articles and other References
1. D. B. Fraser and H. Melchior, *Sputter-Deposited CdS Films with High Photoconductivity through Film Thickness*, The Journal of Applied Physics, Vol. 43, No. 7, Jul. 7, 1972, Pages 3120-7
2. S. M. Jarrett et al., *A Liquid Crystal Light Valve with RGB Color Stipes*, Society of Information Display 1986 Digest, Pages 383-4
3. W. P. Bleha et al., *Optical Engineering*, Vol. 17, No. 4, July-August, 1978, Pages 371-384

4. Grove, *Physics and Technology of Semiconductor Devices*, Wiley Press, 1976, p. 156-163
5. Beard et al., *A.C. Liquid Crystal Light Valves*, Applied Physics Lett., Vol. 22, No. 3, Pages 90-92, Feb. 1973
6. D. Casasent, *Spatial Light Modulators and Their Use in Optical Data Processing*, SPIE Vol. 128 Effective Utilization of Optics in Radar Systems, 1977 Pages 56-67
7. W. R. Roach, *Resolution of Electrooptic Light Valves*, IEEE Trans. Elec. Dev., Vol. ED-21, No. 8, August, 1974, Pages 453-459
8. Matsumoto et al., *Field-Induced deformation of hybrid-aligned nematic liquid Crystals; New Multicolor Liquid Crystal Display*, Journal of Applied Physics, Vol. 47, No. 9, September 1976, pp. 3842-5.

SUMMARY OF THE INVENTION

The present invention describes a light valve which incorporates a bilayer photoconductor structure. The bilayer photoconductor structure has a charge separation region and a charge generation region. This bilayer structure allows for optimization of the switching of a liquid crystal on an area basis. The transparent charge separation layer allows for the accumulation of photogenerated charges. The charge generation layer concentrates the light absorption in a narrow physical region, where high electric fields are present due to the presence of a n-p-n junction. The light valve has switching characteristics dominated by the light and dark carrier densities in the narrow reverse bias region of the photoconductor structure.

By utilizing a separate charge generation layer and a separate charge separation layer in the photoconductor structure of the light valve of the present invention, four important parameters are addressed in which higher performance over prior art light valves is obtained by improvement on these parameters. The four parameters are (1) a long time delay between the generation of positive and negative free carriers and their recombination; (2) the availability of an electric field to move the charges; (3) a long drift path; and (4) a high drift mobility.

BRIEF DESCRIPTION OF THE DRAWINGS

FIG. 6 is a physical geometry of a photoconductor structure of the light valve of the present invention.

DETAILED DESCRIPTION OF THE PRESENT INVENTION

The present invention describes a light valve apparatus which allows for the optimization of the switching of a liquid crystal on an area basis. In the following description numerous specific details are set forth, such as the overall characteristics of materials, circuit parameters, etc., in order to provide a thorough understanding of the present invention. It will be obvious, however, to one skilled in the art that the present invention may be practiced without these specific details. In other instances, well-known methods and structures have not been set forth in order not to unnecessarily obscure the present invention.

Prior Art

In order to describe the improvement provided by the light valve of the present invention, a prior art tutorial is provided in order to describe the short comings of prior art light valves.

Figure 1:
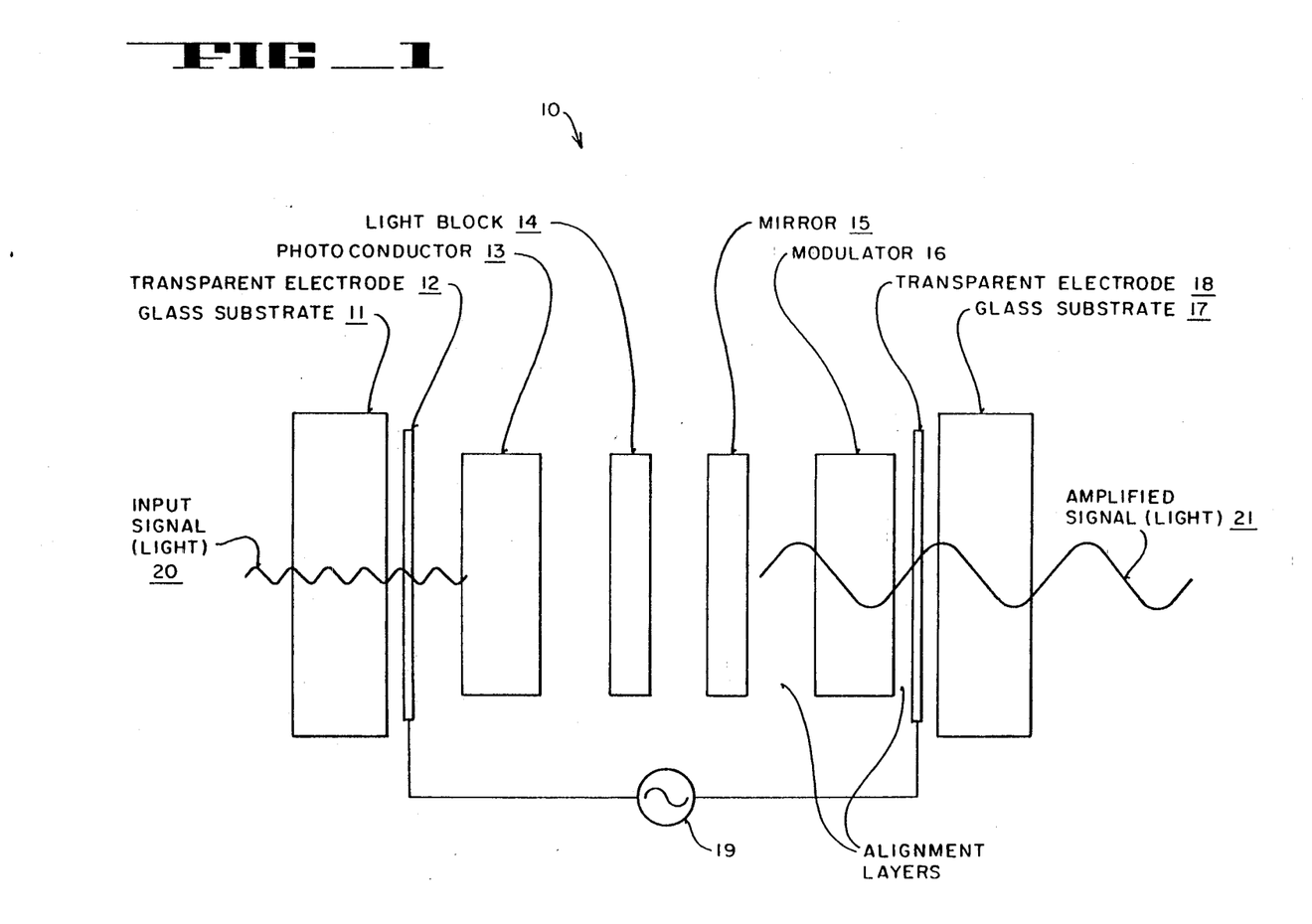
FIG. 1 is a pictorial representation of a prior art light valve.

Referring to FIG. 1, a physical construction of a typical prior art light valve device is shown in which the basic features required for the operation of the device is shown. Although the diagram separates the various layers, it is understood that the layers are actually formed one atop another. The prior art light valve 10 of FIG. 1 is essentially the light valve disclosed in the aforementioned Baumann et al. patent (U.S. Pat. No. 2,892,380). A transparent electrode 12 is applied onto a glass substrate 11. Upon electrode 12, a photoconductive layer 13 of suitable thickness is applied. Then, on photoconductor 13, a light block layer 14 is disposed. Subsequently, on light block 14 a mirror layer 15 is disposed. Next a modulator layer 16 is disposed onto mirror 15 followed by a second transparent electrode layer 18 and a second glass substrate 17. A voltage source 19 applies a voltage between the two transparent electrodes 12 and 18 in order to activate the photo-sensitive surface of the photoconductor 13 and the modulator 16. In operation, input light signal 20 passes through the glass substrate 11 and the transparent electrode 12 and penetrates to the photoconductor 13. The amount of light 20 incident on photoconductor 13 controls the electric field potential through layers 13, 14, 15 and 16. This electric field causes a corresponding variation in the index of refraction of modulator layer 16.

At the output end, a light source projects light through layers 17, 18 and 16 and is reflected from mirror 15. This light is modulated by modulator 16, which modulation is controlled by the electric field. Thus, light 20 incident on the photoconductor 13 controls output light 21 which is reflected back to a viewing surface. The amount of input light 20 per area incident on the photoconductor layer 13 controls the modulation provided by the modulator layer 16 to provide a corresponding per area amplified light signal 21 to be reflected back to a viewing surface. A typical modulator for a light valve is comprised of a liquid crystal. In such prior art liquid crystal materials, alignment layers (or surface treatments) are disposed between the mirror 15 and modulator 16 and between modulator 16 and transparent electrode 18.

Figure 2:
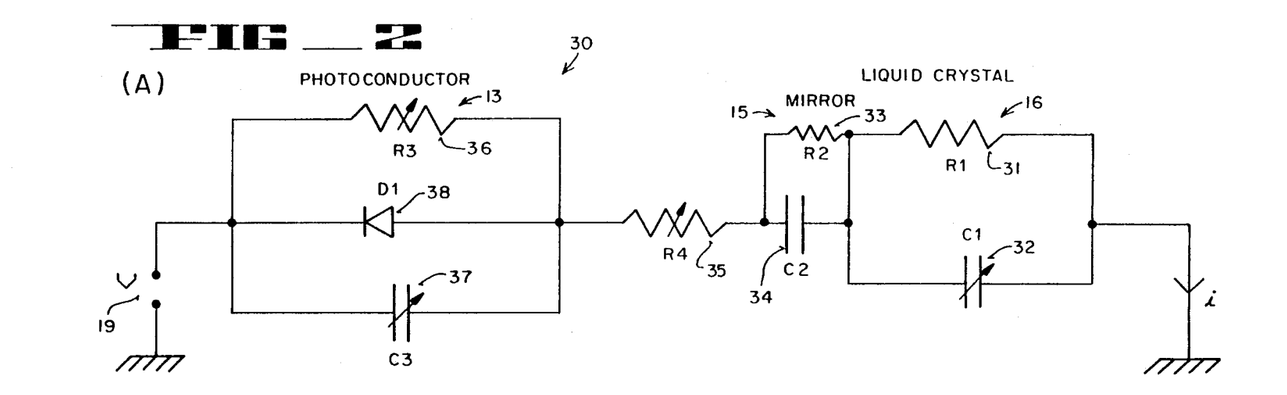
FIG. 2 is an equivalent circuit of the prior art light valve of FIG. 1.

Also referring to FIG. 2, an equivalent circuit 30 for the prior art light valve 10 of FIG. 1 is shown. This equivalent circuit 30 is provided in order to analyze the circuit response of the prior art light valve 10 of FIG. 1. The liquid crystal modulator 16 is represented as a resistor 31 having a resistance value R1 in parallel with a capacitor 32 having a capacitance C1. The capacitor 32 is shown as a variable capacitor because the capacitance C1 of most liquid crystals varies with the detailed orientation of the molecules. Also, with most present day liquid crystals, the leakage resistance depicted by resistance R1 is generally extremely high and, therefore, this leakage is negligible.

Adjacent to the liquid crystal 13 is the mirror layer 15. Mirror 15 is represented by a parallel configuration of resistor 33 having a resistance R2 and a capacitor 34 having a capacitance of C2. Again, the leakage resistance R2 of mirror 15 is sufficiently high so that the actual leakage current in the mirror 15 is negligible. Adjacent to the mirror 15 and light block 14 is the photoconductor layer 13. Photoconductor 13 is represented by a parallel configuration of resistor 36 having a resistance R3, capacitor 37 having a capacitance of C3 and a diode 38 (D1). Actually resistors 35 and 36 represent the combination of the light block 14 and the reverse bias resistance of the diode 38. The forward resistance of the combination is represented by resistor 35.

Thus, in the forward bias direction, diode 38 conducts effectively removing resistor 36. However, when diode 38 is reverse biased, the total back resistance formed by the photoconductor 13 and light block 14 is the combined resistance of resistors 35 and 36 (resistance values of R3+R4) but in the forward direction the combined resistance is approximately R4. The parameters represented by resistors 35 and 36, as well as the capacitance C3 of capacitor 37, are light sensitive and therefore are shown to have a variable value. The actual difference in potential between the input to the photoconductor 13 and the output from the liquid crystal 16 is shown as voltage V in FIG. 2. This voltage V is an AC voltage. The overall switching of the device 10 as described is due to optically stimulated differences in the current i that flows in circuit 30. The described circuit 30 is not dissimilar to the description provided in reference article by W. P. Bleha et al., *Optical Engineering*, vol. 17, no. 4, pages 371 et Seq. It is to be noted that one particular feature of this type of device is the build up of a positive field across the photoconductor 13 and light block 14 by the rectifying action of diode 38.

In order to understand the operation of circuit 30, a number of detailed technical issues pertaining to relative magnitudes of free charges, bound charges and photo-excited charges must be understood in reference to the prior art photoconductor 13. Also, referring to FIG. 3, a physical geometry of the photoconductor 13 is shown. A surface of photoconductor 14 adjacent to glass substrate 11 and electrode 12 is shown as surface 40. A surface of photoconductor 13 adjacent to light block 14 is shown as surface 41. Also shown in FIG. 3 is diode 38 which diode action occurs at the surface junction at the interface of the photoconductor 13 and light block 14.

When the input light signal 20 is coupled to the photoconductor 13, it is absorbed at some internal distance d from surface 40 of photoconductor 13. The absorbed light generates an electron-hole pair within the photoconductor layer 13. It is to be noted that the amount of light available to be turned into electron-hole pairs decreases exponentially with distance d.

Figure 3:
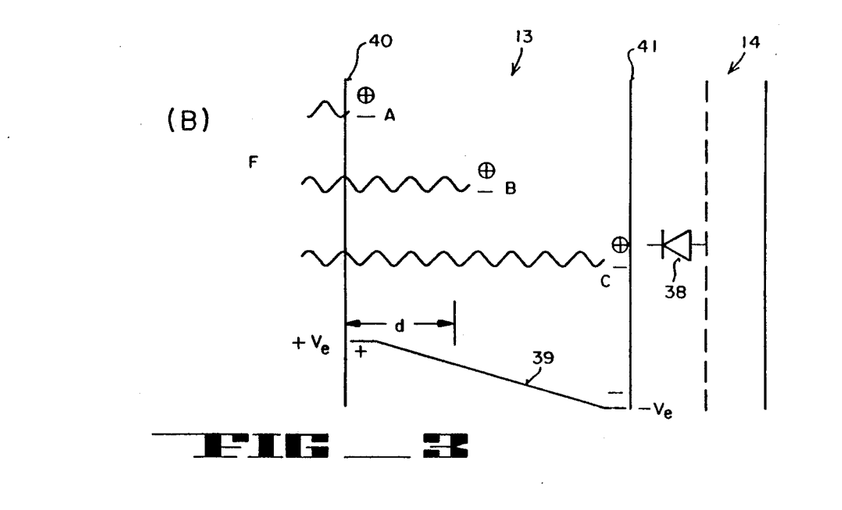
FIG. 3 shows a physical geometry of a single layer photoconductor of the prior art light valve of FIG. 1.

Three hypothetical situations are shown in FIG. 3. In hypothetical example A, the absorption occurs at surface 40 so that distance d equals 0. In example B light is absorbed toward the center of the photoconductor layer 13 and in example C, light is absorbed at the junction between the photoconductor 13 and light block 14. It is to be noted that light can be absorbed at any distance d. The voltage gradient between surfaces 40 and 41 is shown by curve 39.

Referring to FIGS. 1, 2 and 3, an analysis of the functioning of the prior art light valve 10 can be made. In the light, the average current $i_L$ is less than the average current $i_D$ flowing in the dark. The corresponding light and dark voltages, $V_L$ and $V_D$ developed across the modulator 16 are above and below the switching threshold for the modulator 16. A liquid crystal modulator responds to the root mean square (rms) voltage and diode 38 action is not necessary to operate this type of a light valve. The diode action, thought to enhance the switching ratio, is observed in practical devices and is expected as a consequence of the internal electronic structures that have been developed. Due to the rectifying action of the diode 38 junction, there is an average positive potential bias developed across the photoconductor 13 and light block 14.

What is desired is the optimizing of the ratio of $i_L$ to $i_D$ for a given light flux F. Generally, the forward dark current can be considered a parameter of a material and thus largely independent of junction parameters. The reverse dark current is typically dependant upon the rectification ratio and will be small for a good rectifying junction and the bias across the photoconductor layer 13 and light block 14 will be enhanced. It is comparable to the forward current with a poor rectifying junction with a corresponding small bias developed across the photoconductor 13 and light block 14. The question then is how to maximize $i_L$ for a given light flux F.

It is to be noted that four parameters can be established as being critical to having an increased $i_L$ flow. The four parameters are (1) a significant time delay between the generation of positive and negative free carriers and their recombination; (2) the availability of an electric field to move the charges; (3) a long drift path; and (4) an increased drift mobility. It is noted that parameters (1) and (4) are parameters of materials wherein these parameters are selectable within narrow limits. A consequence of these parameters is the rapid fixation of one type of carrier and relative freedom of the other with a generally increased mobility. The following analysis will consider the positive charges to have the lower mobility and to be quickly fixed close to their point of generation. The higher mobility negative charges move in the applied field to contribute to current $i_L$. The remaining parameters restrict the performance of the typical light valve. Since the action of the diode 38 junction is complex, parameters (2) and (3) will be considered in the analysis without a rectifying junction first and then subsequently considered with the presence of a rectifying junction.

Without the presence of a rectifying junction no diode action occurs and no bias will be present across the photoconductor layer 13 and light block 14. The alternating electric field will be symmetrical about zero (ground). Then, considering the first hypothetical case where light is absorbed at surface 40, electrons generated at surface 40 are free to move in the applied field towards the light block 14 as shown in FIG. 3. This condition occurs during the negative half cycle of the alternating voltage 19 applied to the device 10. Electrons are not free to move out of the photoconductor 13 during the positive half cycle since there are no free charges from the dielectric mirror 15 to maintain neutrality. Fundamentally, the light is only partially used to generate $i_L$. There is no practical contribution to current $i_L$ for half the time that light 20 is incident on the photoconductor 13. (In fact, surface absorbed light may also be reflected with a small overall contribution to the device. The major portion of the photoconductor structure is unaffected and this light has no major switching ability with respect to the modulator.)

In the second hypothetical case when light is absorbed towards the center of the photoconductor 13, shown as case B in FIG. 3, electrons freed toward the center of the photoconductor 3 can generate current by moving in response to the external field, up to the electrons reaching either surface 40 or 41 during both cycles of the applied voltage 19. Optimum currents are generated when the electrons are oscillated between the two extremes such that a minimum time is spent close to the fixed positive ground states. Maintaining maximum separation of the photo-excited charges in this fashion attempts to take full advantage of parameter (1).

Finally, in case C where light is absorbed at the junction of the photoconductor 13 and the light block 14, light absorbed at the interface of the two layers 13 and 14 generate free electrons that can drift in the external field towards the center of the photoconductor 13, but have a very limited motion to the mirror 15 during the negative half cycle of the alternating voltage 19. The contribution to $i_L$ is quite small during the negative half cycle of the alternating voltage 19 and the incident flux F is therefore not contributing to the switching of the modulator 16. This is only true if electrons are inhibited from entering the photoconductor 13 from the transparent electrode 12. With electron injection from the transparent electrode 12, there can be a continuing contribution to $i_L$. It should be noted that very little light, or light that is weakly absorbed, reaches the interface between the photoconductor 13 and the light block 14. This light has no major switching ability with respect to the modulator.

Thus, it can be seen from the above analysis that the light valve is not optimizing the contribution of the incident flux to the switching of the modulator 16, unless a significant portion of the light is absorbed in the center of the photoconductor 13. Some advantage can be gained from the injection of electrons if the light 20 is absorbed near the interface between the photoconductor 13 and the light block 14. However, it is to be noted that absorption of light in a uniform medium decreases exponentially. Thus, as the light flux penetrates deeper into photoconductor 13 from surface 40, the intensity is decreased in proportion to the distance from surface 40 or the radiation is absorbed at surface 40 much more than can be made available at the center of the photoconductor 13. Further, there is even less light available further towards the interface between the photoconductor 13 and the light block 14. Thus, it is not possible to optimize parameters (2) and (3).

Similar reasoning applies when the effect of the diode action is considered in the analysis by the presence of a rectifying junction. Surface 40 of the photoconductor 13 carries a positive bias with respect to the rear of the light block 14. Electron-hole pairs generated by light 20 will be separated by drifting in this bias field. Each photo-excited electron will oscillate about an average position further towards surface 40 of the photoconductor than its initial position. The overall effect of this bias is to make surface 40 absorbed light (shown as position A) even less effective and to move the position of optimum absorption towards the interface 41 of photoconductor 13 and light block 14. The ideal absorption depth is governed by the average drift length of a photoexcited electron in the bias field before recombination with a fixed hole. Thus, light should be absorbed one drift length from the center of the photoconductor 13 towards the interface 41 between the photoconductor 13 and the light block 14, such that, on the average, the photo-electron oscillates about the center of the photoconductor 13. Such condition corresponds to the case when electrons are freed toward the center of the photoconductor 13 at position B when the bias is zero and light can contribute most effectively to the switching of the modulator.

It is to be noted that the situation degrades further as far as optimizing parameters (2) and (3) when bias is considered. A high bias field increases the drift length and contributes directly to $i_L$. A long drift path between excitation of a free electron and its recombination with the positive ground state places increasingly severe demands on where the light can be usefully absorbed. The higher the bias level, the further the light must penetrate to be effective. The incoming flux F decreases exponentially with distance and the requirement for absorption further into the photoconductor 13 drastically decreases the efficiency of the light valve. Deficiencies present in the conventional prior art light valves have been recognized and one such attempt to absorb light near the interface between the photoconductor and the light block to overcome the deficiency is described in the aforementioned U.S. Pat. No. 3,976,361.

Two final considerations need to be considered in analyzing the deficiencies inherent in the conventional prior art light valve. These considerations relate to the internal electric field under photo-excitation and the speed of the response, particularly the time for decay of excitation after removal of the flux F. Most of the flux F is absorbed in the first half of the photoconductor layer 13. The free electrons drift under the influence of the bias field as they oscillate in response to the external AC voltage 19. The charge separation in the bias field acts to reduce the potential gradient. In typical operation, a significant amount of the light is absorbed in a region with a much reduced bias. However, in this reduced bias region, the bias is limited in its beneficial effect of separating the electrons and the holes. A good portion of the photo-excitation relaxes quickly in a relatively field free region near the surface with a limited contribution to $i_L$. Thus, an ideal geometry provides for a high field region for light absorption and charge separation to retain the beneficial characteristics of parameter (1).

When the flux F is removed, there are fixed positive charges separated by some physical distance from the oscillating free electrons. A considerable period of time can elapse before the electrons cease to contribute to the current flowing in the light valve. The result is a persistent after image. The requirement (1) of a long time delay between carrier generation and recombination leads to a persistent image remaining since parameter (1) is achieved by making sure that the electrons do not relax quickly to the positive ground state.

Light valves that have injecting contacts on the photoconductor 13 can be particularly troublesome with persistent images and ghosts during the operation of the amplifier. These effects are associated with significant excess electron injection. Good charge separation and a high ratio of $i_L$ to $i_D$ are in conflict with the desirability of having minimal persistence of amplified images. Thus, in summary, there are significant unresolved, fundamental problems associated with the conventional prior art light valve devices.

PRESENT INVENTION

Figure 4:
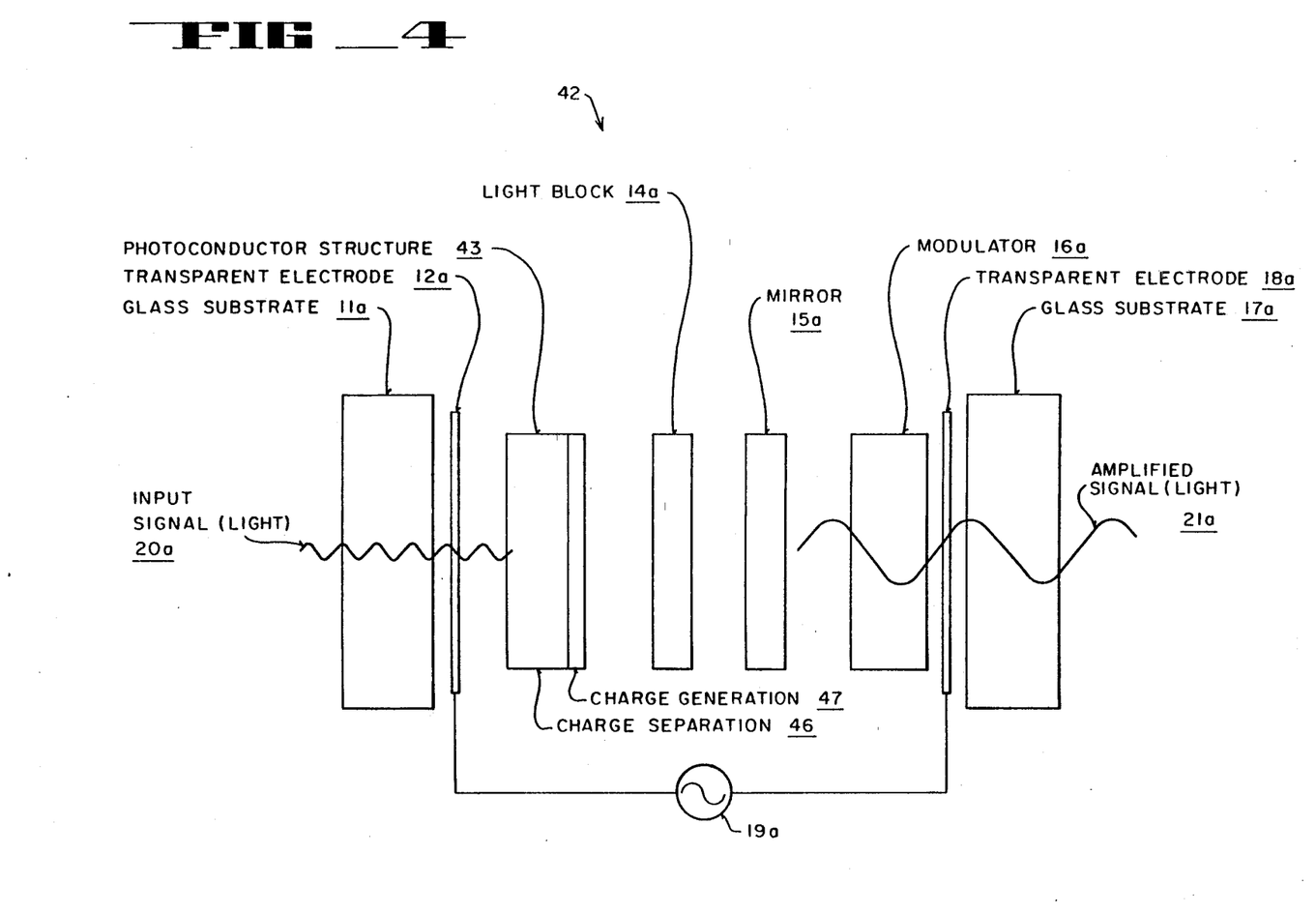
FIG. 4 is a pictorial representation of a light valve of the present invention.

Referring to FIG. 4, a light valve 42 of the present invention is shown. The light valve 42 provides an improved performance over the prior art light valve in that light valve 42 optimizes the absorption of the incident light flux F and couples the effect of this absorption to the switching of the modulator.

The outward basic structure of the light valve 42 of the present invention is equivalent to the prior art light valve 10 shown in FIG. 1. Thus, glass substrates 11a and 17a, the two electrodes 12a and 18a, light block 14a, mirror 15a and modulator 16a are equivalent to those same elements 11, 12, 14–18 of FIG. 1 (A letter "a" has been appended to those elements of FIG. 1 to differentiate the present invention). Further, the modulator 16a of the preferred embodiment is comprised of a liquid crystal which is well known in the prior art. An AC voltage source 19a provides an AC voltage V to the electrodes 12a and 18a.

However, photoconductor layer structure 43 of the present invention is unlike the photoconductor layer 13 of FIG. 1. Instead of a single layer photoconductor 13, the present invention employs two distinct and separate layers 46 and 47 for the photoconductor structure 43. That is, photoconductor structure 43 is comprised of a charge separation layer 46 and a charge generation layer 47 to provide a bilayer photoconductor 43 instead of the single layer photoconductor 13 of the prior art device 10 of FIG. 1. The charge separation layer 46 is adjacent to the first electrode 12 while the charge generation layer 47 is adjacent to the light block 14a.

Figure 5A:
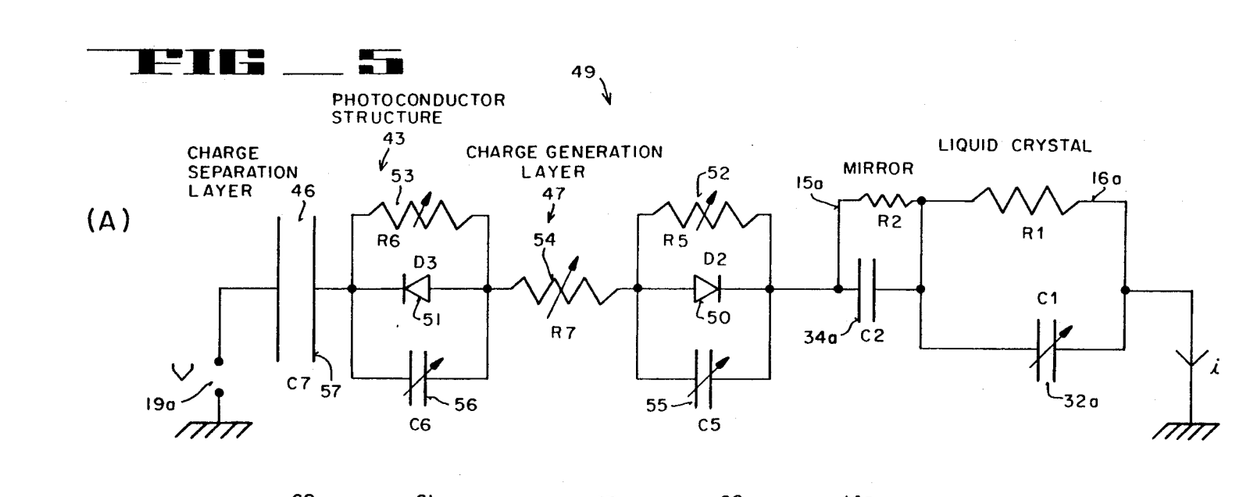
FIG. 5 is an equivalent circuit of the light valve of the present invention.
Figure 5B:
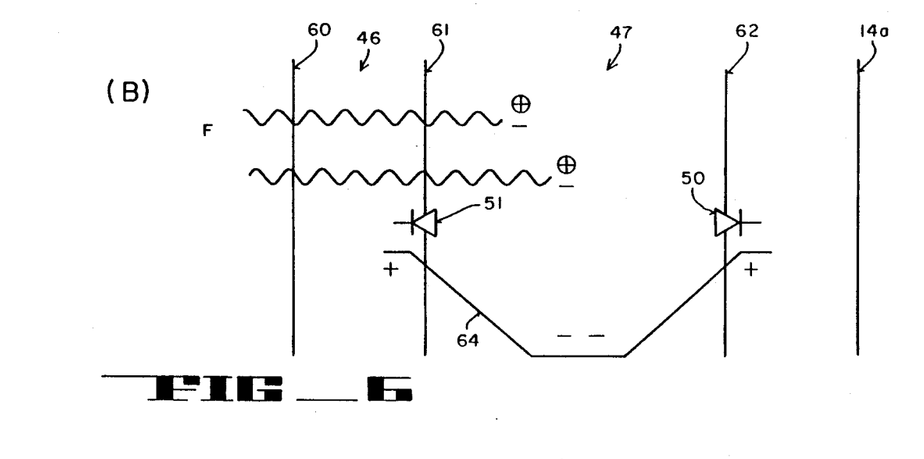

The purpose of the bilayer photoconductor 43 is to provide a n-p-n junction on both sides of the portion of the photoconductor structure 43 which generates electron-hole pairs. An equivalent circuit 49 for the light valve 42 is shown in FIG. 5 and a physical geometry diagram of the photoconductor structure 43 is shown in FIG. 6. The liquid crystal and the mirror portion of circuit 49 are equivalent to those elements of the prior art light valve equivalent circuit 30. Namely, liquid crystal 16a is represented by a parallel combination of resistor 31a having a resistance R1 and a variable capacitor 32a having a capacitance C1; and the mirror 15a is represented by a parallel combination of resistor 33a having a resistance R2 and a capacitor 34a having a capacitance C2. However, the equivalent circuit representing the photoconductor structure 43 of the present invention is considerably different from the equivalent circuit portion of the photoconductor 13 of the prior art device 10.

The photoconductor structure 43 is represented by a combination of two back-to-back diodes 50 and 51 (D2 and D3, respectively). As can be seen in FIG. 6, diode 50 represents a p-n junction which occurs at surface 62 at the junction of the charge generation layer 47 and light block 14a. The second diode 51 represents an n-p junction at surface 61, which is the junction of the charge generation layer 47 and charge separation layer 46. The two p-n junctions are formed by making the charge generation layer 47 more "p-type" than the light block 14a, as well as the charge separation layer 46.

The equilibrium charge distribution across the photoconductor structure 43 is such that a positive layer is formed on either surface 61 or 62 of the charge generation layer 47. The charge generation layer 47 becomes negative in potential by the diffusion of holes into the outer layers 46 and 14a and by the diffusion of electrons into the central layer 47 until an equilibrium is established. A potential gradient curve 64 depicts the potential well formed by the n-p-n junction formed by the three regions 46, 47 and 14a. Incoming light flux 20a (F) incident on surface 60 of the charge separation layer 46 drift rapidly and with little spatial spread and minimal recombination into the central region 47, because the charge generation layer 47 is thin and highly absorbing for the light flux F. The positive holes of the hole-electron pair generated by the light are trapped within the potential well of region 47. Therefore, mobile electrons are available to contribute to device current i.

The equivalent circuit 49 components for the photoconductor structure 43 is shown in FIG. 5. A parallel combination of diode 50, resistor 52 having a resistance of R5 and capacitor 55 having a capacitance of C5 represent the p-n junction formed at surface 62. R5 and C5 represent the leakage resistance and capacitance of the diode 50. The n-p junction formed at surface 61 is represented by the parallel combination of diode 51, resistor 53 having a resistance of R6 and capacitor 56 having a capacitance of C6. R6 and C6 depict the leakage resistance and capacitance of the diode 51. Resistor 54 coupled in series between the two diodes 50 and 51 represents the forward resistance of the diode 50 or 51, whichever is conducting, plus the resistance of the light block 14a. Resistance R7 typically has a small value since it is always in series with a reverse bias diode 50 or 51. Finally, the charge separation layer 46 is represented by a capacitor 57 having a capacitance of C7. Voltage V applied to the serial loop formed by the charge separation layer 46, charge generation layer 47, the mirror 15a, light block 14a and the liquid crystal 16a provides for a loop current i which flows through circuit 49. As can be seen by comparing the equivalent circuit 49 of the present invention to the prior art equivalent circuit 30, it can be noted that a second diode 50 and its attendant leakage parameters is included in the equivalent circuit loop.

An analysis of the operation of the light valve 42 of the present invention follows. The operation of device 42 in the dark is determined by the leakage resistances and capacitances R5, R6, C5 and C6 of the two diodes 50 and 51. The common forward impedance associated with diodes 50 and 51 is represented by resistor 54. However, the value R7 of resistor 54 can be ignored since its value is negligible as it is always in series with one of the diode 50 or 51. One diode 50 or 51 is always reverse biased due to the AC voltage. Thus, in the overall analysis, there is a capacitive voltage division of the applied potential V with no net current flow in the circuit. The rms potential in the liquid crystal 16a is determined by the values of capacitors 57, 56, 55, 34a and 32a and the reverse leakage resistors 52 and 53. Because the impedance of capacitor 34a in a typical device is negligible at the operating frequency, capacitor 34a of the mirror can be ignored. Further, because the resistive component R2 associated with the mirror and the resistive component R1 of the liquid crystal are significantly high, their leakage can also be ignored. Thus, the key remaining circuit parameters are the leakage capacitances C5 and C6 of the diodes 50 and 51, the capacitance of the liquid crystal C1 and the capacitance C7 of the charge separation layer 46 and the reverse leakage resistances R5 and R6.

The capacitance C1 of the liquid crystal 16a is governed by the materials parameters and cavity geometry for well established systems of practical interest and these parameters are well known in the prior art. For these well established devices, it can be considered as fixed within moderate limits. However, the capacitance C7 of the charge separation layer 46 is controlled by its thickness and dielectric properties. During operation either diode 50 or 51 is forward biased on a given voltage cycle. The capacitance value of the reverse bias diode of a given cycle need only be considered in the analysis since the other leakage capacitance is shorted due to the conduction of its diode. In designing the photoconductor structure 43, the charge generation region 46 is to be made sufficiently thin. A sufficiently thin charge generation region 47 allows junction fields to efficiently separate the photo-generated charge, retain high resolution and minimize recombination losses. Thus, the primary function of charge generation region 47 is to absorb the light flux F. The thinness of the charge generation region 47 of the preferred embodiment is approximately one micron in depth and has a fully depleted capacitance associated with this thickness and, further, the capacitance is large in comparison to the capacitance C1 of the liquid crystal.

The expected capacitance of a reverse bias junction can be estimated by applying general semiconductor theory (see Grove, "Physics and Technology of Semiconductor Devices", Wiley, 1967, page 159). The depletion width in the simple case of step junction is given by:

$$W^2 = \frac{2*K*K_0*\phi}{q*Na} \quad \text{(Equation 1)}$$

where W is the width ($W^2$ being the square of the width), K is the dielectric constant, $K_0$ the permittivity of free space, $\phi$ the junction height, q the electronic charge and Na the dominant impurity concentration. In the preferred embodiment where W represents the charge generation region 47, W equals 1 micron. For the preferred embodiment, a dielectric constant equals 5, $\phi$ is equal to 0.5 volts and the impurity concentration Na approximately equal to a nominal $2.7*10^{14}$ ions/cm$^3$.

The charge separation layer 46 has a nominal dielectric constant of five and can be designed with a thickness in the range of 5-20 microns. The minimum capacitance of the diode junction 61 and 62 is determined primarily by the thickness of the charge separation layer 46. The parallel capacitance C6 of diode 51 serves the function of separating the photo-excited carriers with its large internal field of approximately 5,000 volts/cm. Thus, most of the externally applied potential is dropped across capacitor 57 of the charge separation layer 46.

Figure 7:
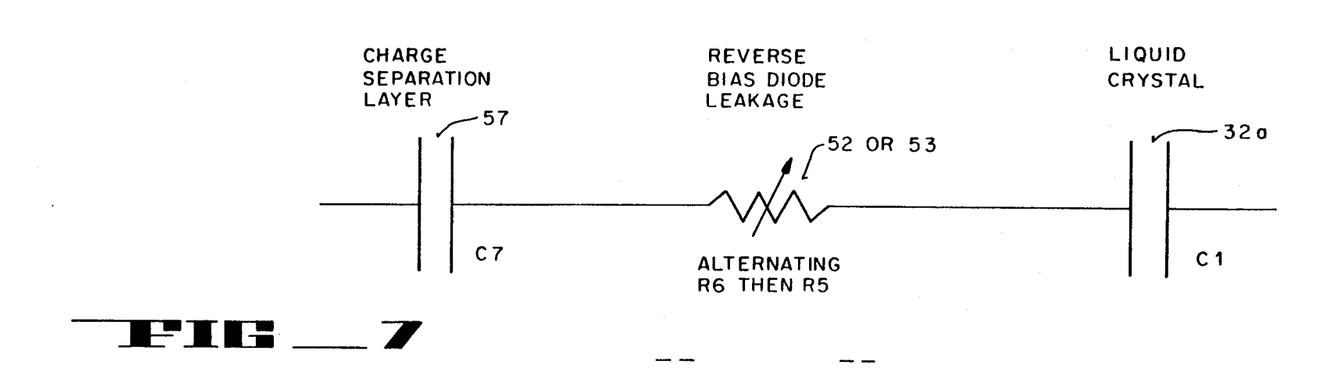
FIG. 7 is an equivalent circuit showing the circuit components which develop voltage for the light valve of the present invention.

During the negative half cycle, identical considerations apply to the electrical geometry of FIG. 6. The minimum capacitance of capacitor 55 of diode 50 is determined by the capacitance C1 of the liquid crystal 16a. Taking this into consideration, a simplified circuit diagram can be obtained where the operation of the device of the present invention is seen to be due to the oscillation of charges in the applied field between the two capacitors 57 and 32a. This equivalent circuit is shown in FIG. 7. Further the internal generation of charges in a dark condition and in a light condition are repectively shown in FIGS. 8a and 8b.

In the equivalent circuit of FIG. 7, only capacitors 57 (C7) and 32a (C1) are shown, since most of the externally applied potential is dropped across these two capacitors 32a and 57. The only resistance of concern is the resistance of the back biased diode. Thus, either resistor 52 or 53 is in the circuit at any one time to represent the back bias diode. The polarity of the AC voltage V determines which of the diodes 50 or 51 is not conducting.

It is well known that an n-p-n device is a common circuit element and that the principle source of leakage is due to two components. The two components are referred to as the generation current within the depletion region and the diffusion term outside of the depletion region. For n-p-n structures with low intrinsic carrier densities (for example, materials that have high band gaps), the diffusion component is small in comparison to the drift component.

Thus, the generation current per unit area of junction is given by:

$$I_{GEN} = \frac{q*Ni*L}{2*T_0} \quad \text{(Equation 2)}$$

wherein $I_{GEN}$ is the generation current, TO is the carrier lifetime, Ni is the intrinsic carrier density and L is the thickness of the active region. The limitations and application range of this approximation is further discussed in the aforementioned reference by Grove, "Physics and Technology of Semiconductor Devices", Wiley, 1967, page 174. Equation (2) is believed to be appropriate for practical light valves and the values of R6 and R5 are determined by this current generation mechanism. The incoming light flux F will generate carriers in addition to the above thermal rate which will also decay with a similar characteristic lifetime.

When light flux is applied as an input, the generation current due to this light is:

$$I_{LIGHT} = \frac{q*N}{T_0} \quad \text{(Equation 3)}$$

wherein all the flux F is sensibly absorbed in the charge generation region 47 and N is the steady-state carrier density. Therefore, the relative values of $I_{GEN}$ and $I_{LIGHT}$ determine the effective value of R6 or R5 and the voltage across the liquid crystal, namely capacitor 32a.

The number of carriers thermally generated in the thickness L of region 47 competes with the external flux absorbed in the same region. The signal to noise ratio is improved when the thickness of the charge generation layer 47 relatively thin and preferably this layer is approximately 1 micron or less.

Figure 8A:
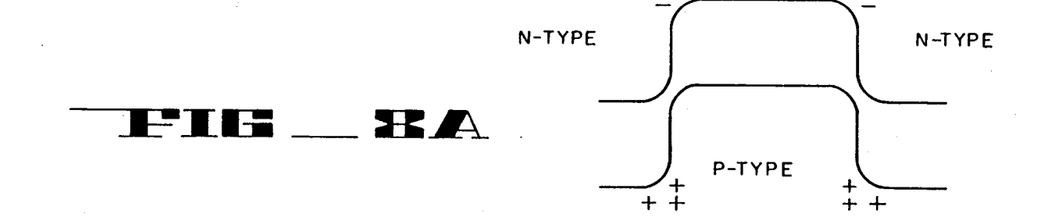
FIG. 8a is a pictorial diagram showing a charge separation at equilibrium.
Figure 8B:
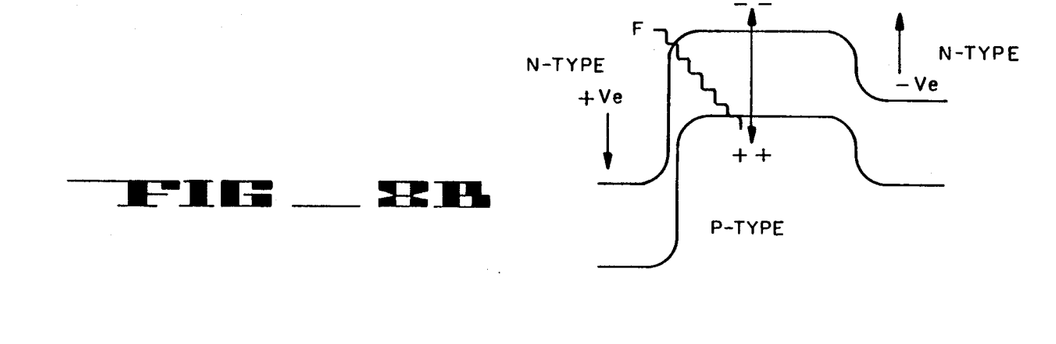
FIG. 8b is a pictorial diagram showing a charge separation when an incoming light flux is presented to the photoconductor structure of the present invention.

Also referring to FIGS. 8a and 8b, the band diagrams illustrate the development of the electronic charges in the charge generation region 47 of the n-p-n structure, which charges are free to flow to regions 46 and 14a at either side of the charge generation region 47. It is to be noted that carriers can be swept across the thin charge generation region 47 with little loss to recombination. Thus, electrons generated by the incoming light flux F can make many transits between the two capacitors 57 and 32a.

There is increased sensitivity associated with the gain of a photo-transistor optical structure of the present invention. The gain is limited by the ratio of the depletion capacitance (i.e., the capacitance associated with W of Equation 1) to the charge separation capacitance (i.e., the capacitance associated with the width of layer 46). This ratio is that of the width of the charge separation layer 46 to the width of the charge generation layer 47, corrected for the small differences in their dielectric properties. Similar consideration applies for both the positive and negative cycles of the applied potential V. On the negative half cycle, the limit is determined by the ratio of the depletion capacitance to that of the dominant capacitance, which is the liquid crystal/mirror combination of capacitors 32a and 34a. The physical origin of the enhanced sensitivity lies in the n-p-n transistor action and the effective increase in the lifetime of a photo-excited carrier by having the electron charges spend most of their time away from the positive holes trapped in the potential well.

Making the value of the capacitance C7 similar to that of the liquid crystal/mirror capacitance combination allows symmetrical operation and most efficient use of the incident flux F. If the value of the capacitance C7 is much larger than the liquid crystal/mirror capacitance combination, then it can store little charge on the positive half cycle. On the other hand, if C7 is much smaller than the liquid crystal/mirror capacitance combination then the voltage drop across capacitor 57 dominates the operation of the device. It is to be noted that the current gain associated with the charge separation layer 46 is similar to the advantages obtained from injecting contacts in the conventional light valve of FIG. 1 but without the debilitating persistence of images.

FIG. 8a illustrates the generation of the charges at equilibrium. The n-p-n structure is represented by having the p-type charge generation layer 47 bounded by the two n-type regions 46 and 14a. At equilibrium, the source of the reverse leakage current is due to the generation of the electron-hole pairs. Thus, the dark current $i_D$ is determined by the thermal generation at equilibrium.

In FIG. 8b, the diagram exemplifies a condition when an incoming flux F penetrates to the charge generation region during a positive voltage half cycle across the back-to-back diodes. Flux F causes the generation of additional electron-hole pairs wherein the holes are trapped in the p-type well while the electrons generated by flux F are free to be mobile.

The results to be obtained from the operation of the light valve of the present invention provides for a significant advantage over the prior art light valve. It is to be noted that in the dark, an alternating voltage is divided between the two capacitors 57 and 32a and the reverse resistance of the black-to-back diodes are such that there is an alternating potential across the liquid crystal 16a whose rms value aligns the molecules of the liquid crystal. The alignment will cause a half-wavelength phase delay between orthogonal components of polarized light traversing the device. In the light, the reduction in the value of the leakage resistance by the light causes an increase in the rms voltage across the liquid crystal 16a which reduces the phase delay to zero. These two states, the dark and the light states, are the on and off conditions of the light valve.

The light valve of the present invention can be evaluated with respect to the four switching parameters discussed previously. The four parameters are (1) a long time delay between the generation of positive and negative free carriers and their recombination; (2) the availability of an electric field to move the charges; (3) a long drift path; and (4) a high drift mobility. The light valve of the present invention strongly enhances the first parameter by removing the free carriers from the vicinity of the positive ground state. Though this does not change the dynamics of the relaxation of carriers in the depletion region, it allows for much better utilization of the input signal. Electrons are swept from the excitation region 47 to the charge storage element where the electrons can be used to contribute to the charging of the liquid crystal 16a. The electric field that quickly and efficiently separates the photo-excited carriers is provided by the n-p-n junctions. This condition also optimizes the second parameter in that the fields are stronger and closer to where the light is absorbed. As to parameter (3), an effective long drift path is provided in that electrons contribute to the operation of the light valve by responding to both half cycles of the alternating field. The drift path is limited by the integrated losses, principally the recombination of the free carrier as it traverses the charge generation region 47. Great flexibility is enjoyed to select materials which exhibit high mobility since layer 46 and layer 47 do not combine the photoconductor function. It is to be noted that this last parameter is not of significance to the charge separation structure which is only required to store a charge and not transport free carriers.

Another particular advantage of the light valve of the present invention is the retention of very high quality imaging by minimizing the contribution of diffusion currents to the operation of the light valve. It is to be noted that all significant movement of the image bearing carriers is under the influence of strong electric fields. The image is not degraded by lateral difusion of carriers associated with steep carrier concentration gradients. In addition, the light is absorbed close to the modulating medium rather than at the input face of the device. High sensitivity is associated with the physical displacement of the charge carriers. On removal of the incoming light flux F and/or the alternating potential V, the photo-excited carriers can rapidly recombine in the narrow charge generation region 47. Thus, the light valve design of the present invention overcomes the basic sensitivity and speed limitations inherent in the conventional prior art light valve structures.

It is appreciated that a typical liquid crystal of 10 microns thickness can be constructed of materials well known in the prior art. Such materials have a dielectric constant of 10 and switch with a nominal 10 volts. The capacitance of such a structure is approximately 885 picofarads/cm$^2$. The charge on such a structure to switch from 5 volts to 10 volts typically is in the range of 4.4 to 8.8 nanocoulombs per square centimeter. This requires the switching of $2.7 \times 10^{10}$ electrons per square centimeter. This number of electrons, at unit quantum efficiency with two electron volt (eV) photons, can be provided by 100th of a microjoule of incident flux F. It is appreciated that present day light valve devices use from 10 to 100 microjoules to switch in time periods that are typically 100 milliseconds. Further, present day light valve quantum efficiencies are no more than 1.0 percent and more typically are significantly less. The light valve of the present invention offers significantly improved quantum efficiencies.

Thus, the princple reasons for the poor performance of prior art light valves are addressed by the light valve of the present invention. The light valve of the present invention uses the well established advantages present in an n-p-n photo-transistor structure. There is a direct linear relationship between the light flux F and the electrons available to switch the liquid crystal. This fact additionally provides for a good gray scale when the light valve is operated with a suitable liquid crystal geometry. The optimization of the light valve of the present invention focuses on the signal to noise ratio (or detectivity) of a basic charge generation layer. The charge separation layer 46 is used to optimize the switching of charges to the liquid crystal modulator 16a under the control of photo-excited carriers in the charge generation layer 47. The switching speed of the modulator 16a can therefore be adjusted. The modulator speed depends on the square of the voltage which is controlled by the capacitance C7 of the charge separation layer. As in all flexible detectors or amplifiers, the fundamental limits are ones of signal to noise within a given bandwidth. Thus, these optimization techniques are available when using the light valve of the present invention.

Thus a high performance light valve is described. It is to be noted that although a particular light valve having a "p-type" well is described, equivalent considerations apply for a charge generation layer which is more "n-type" than the outer layers. In that instance, diodes 50 and 51 will each be reversed in the circuit analysis.

What is claimed is:

1. A light valve comprising:
a first transparent substrate;
a first electrode disposed at one side of said first transparent substrate layer,
a photoconductor disposed at a side of said first electrode opposite a side disposed next to said first transparent substrate, said photoconductor consisting of two separate layers, one charge separation layer and one charge generation layer, said charge separation layer adjacent to said first electrode, said charge separation layer having a first thickness, said charge generation layer not adjacent to said first electrode, said charge generation layer for absorbing light received from an input light source, said charge generation layer having a second thickness, said second thickness being relatively less than said first thickness;
an insulator functioning as a light block disposed adjacent to said charge generation layer of said photoconductor;
a mirror disposed at an opposite side of said insulator not adjacent to said charge generation layer;
a liquid crystal modulator disposed adjacent to said mirror at a side opposite said insulator;
a second electrode disposed at a side of said liquid crystal modulator opposite said mirror; and
a second transparent substrate disposed on a side of said second electrode opposite said modulator.

2. The light valve as recited by claim 1 wherein said charge generation layer is formed to supply n-p and p-n junction between said insulator and said charge separation layer.

3. The light valve as recited by claim 1 wherein said charge generation layer is formed to supply a p-n junction adjacent to said insulator.

4. The light valve as recited by claim 3 wherein said charge generation layer is formed to supply a n-p junction adjacent to said charge separation layer.

5. The light valve as recited by claim 1 wherein said charge generation layer is formed of a material which is more "p-type" than said insulator.

6. The light valve as recited by claim 1 wherein said charge generation layer is formed of a material which is more "p-type" than said charge separation layer.

7. The light valve as recited by claim 1 wherein said charge generation layer is approximately one micron in depth.

8. In a light valve having a light source for causing light to pass through, in order, first transparent substrate, a first electrode, a photoconductor, a light block mirror, a modulator, a second electrode and a second transparent substrate, an improvement wherein said photoconductor consists of two separate layers, one charge separation layer and one charge generation layer, said charge separation layer having a first thickness, said charge generation layer having a second thickness, said second thickness being thinner than said first thickness, said charge separation layer located between said first electrode and said charge generation layer.

9. The improvement of claim 8 wherein said charge generation layer is formed adjacent to said first transparent substrate.

10. The improvement of claim 9 wherein said charge separation layer is formed adjacent to said charge generation layer.

11. The improvement of claim 8 wherein said charge generation layer is formed to supply junctions between said insulator and said charge separation layer.

12. The improvement of claim 11 wherein said junctions are n-p and p-n junction.

13. The improvement of claim 8 wherein said charge generation layer is formed to supply a first junction adjacent to said insulator.

14. The improvement of claim 13 wherein said first junction is a p-n junction.

15. The improvement of claim 13 wherein said charge generation layer is formed to supply a second junction adjacent to said charge separation layer.

16. The improvement of claim 15 wherein said second junction is a n-p junction.

* * * * *